March 14, 1961  P. M. JACCARD  2,974,552
DEVICE FOR AFFIXING LEADS TO A FISHING LINE
Filed Sept. 3, 1958  3 Sheets-Sheet 1
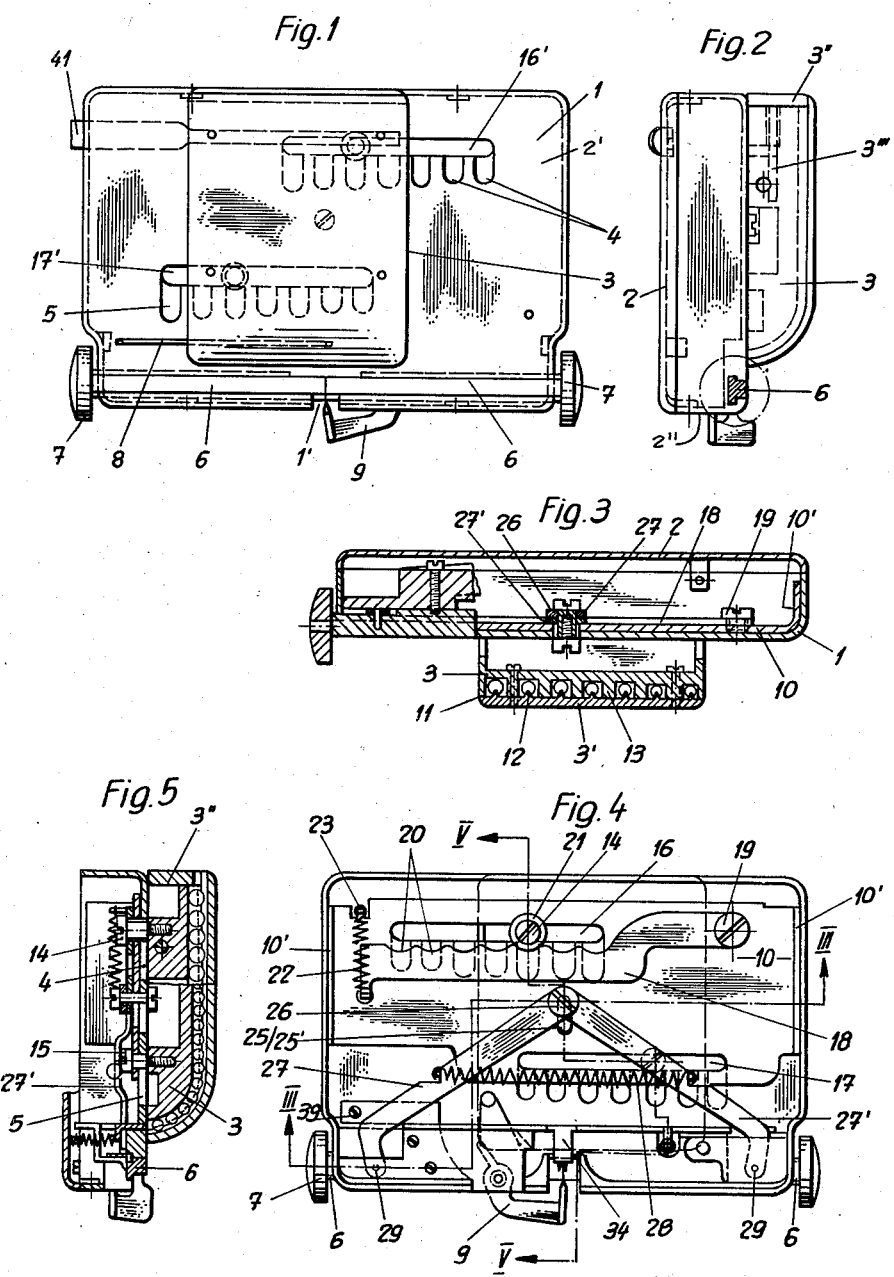
INVENTOR
PIERRE M. JACCARD
By Linton and Linton
ATTORNEYS

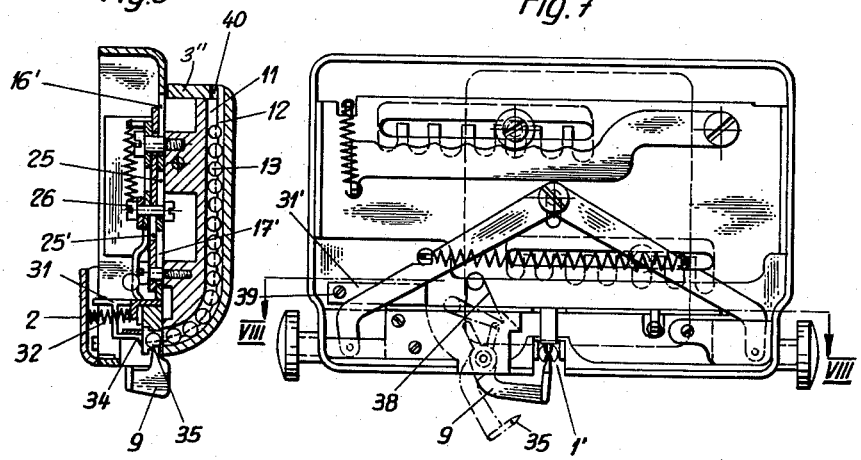
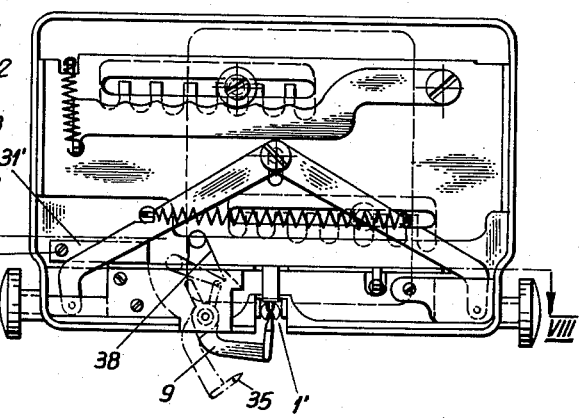
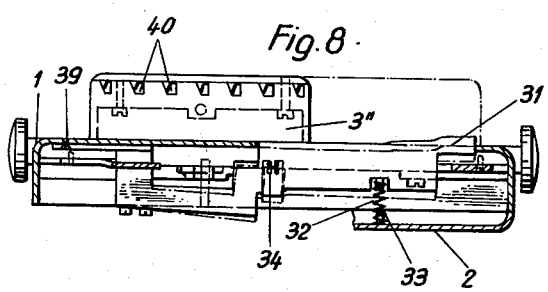
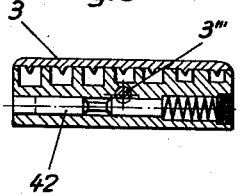
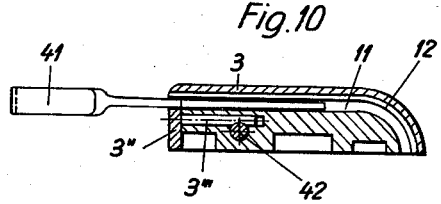
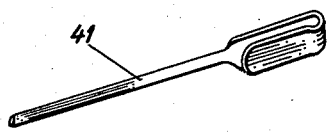

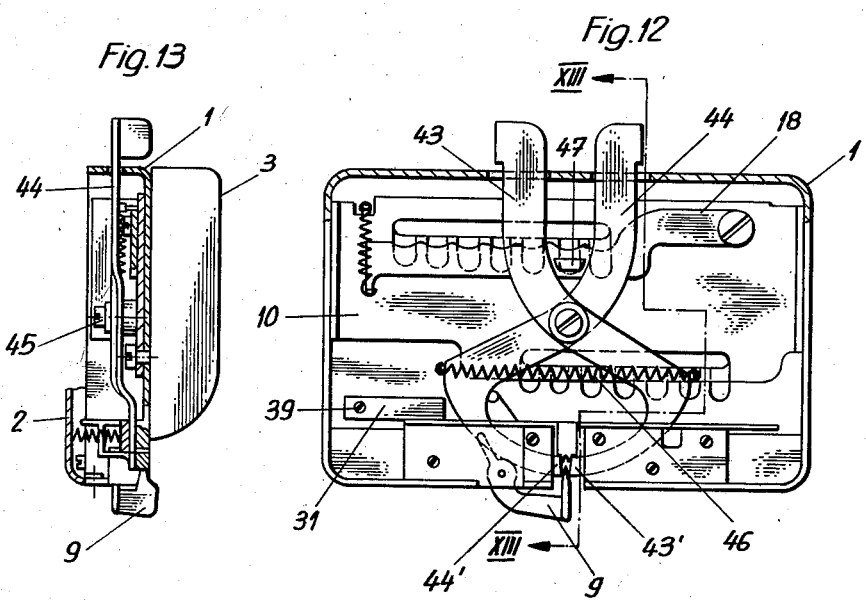

United States Patent Office 2,974,552
Patented Mar. 14, 1961

2,974,552
DEVICE FOR AFFIXING LEADS TO A FISHING LINE

Pierre M. Jaccard, Culliairy-Ste-Croix, Switzerland

Filed Sept. 3, 1958, Ser. No. 758,842

Claims priority, application Switzerland Feb. 12, 1958

6 Claims. (Cl. 81—15)

The present invention is directed to a device for affixing lead sinkers to fishing lines.

After choosing the lead sinker of the right size, the angler inserts the fishing line into the slit, then presses the lead sinker together by means of a pair of pliers in order to close the slit and thereby fix the lead sinker to the line. This operation, which must often be performed on the spot, is difficult especially in cold and rainy weather as the lead sinkers are small and the fingers numb and slippery. The lead sinkers can thus easily escape the fingers, causing loss of time and material.

There exist accessories intended to facilitate this operation, but they are neither practical nor effective. The sinker must be selected in a box by means of a special instrument, then placed in a groove between two rods which are thereupon pressed together in order to close the slot. The lead sinkers get lost between the box and the fastening accessory, and only medium-sized lead sinkers can be used. Neither very small nor large sinkers can be used and no means is provided for taking into account the differences in the diameters of the sinkers.

The object of the present invention is to obviate these drawbacks and to permit the angler to choose the desired size of sinker rapidly and to fix it on the fishing line without fumbling or waste of time.

By way of example the enclosed designs show two embodiments of the device according to the invention.

Fig. 1 is a back view of the device from the loader side;

Fig. 2 is a side view of the same device;

Fig. 3 is a cross-sectional view taken along line III—III of Fig. 4;

Fig. 4 is a front view of the device with the case open;

Fig. 5 is a cross-sectional view taken along line V—V of Fig. 4;

Fig. 6 is a similar view, but with the loader in the working position;

Fig. 7 is a view similar to that of Fig. 4 but with one lead sinker held between the jaws of the fastening device;

Fig. 8 is a partly sectional view taken along line VIII—VIII of Fig. 7;

Figs. 9 and 10 are cross-sectional detail views of the loader;

Fig. 11 shows an accessory;

Fig. 12 is a cross-sectional view of a second modification of the invention; and Fig. 13 is a further cross-sectional view taken on line XIII—XIII of Fig. 12.

The device shown in Figs. 1 to 10 comprises a parallelepiped-shaped case 1 containing and holding all the elements of the actual device. Case 1, the front side of which consists of a detachable cover 2, contains a support plate 10 slideably arranged against the back 2' of case 1 and occupying the entire length of said case. The ends 10' of said plate 10 are bent back at an angle and form two guide shoes of the support plate which slide on the end walls of the case. Said support plate 10 is provided with a longitudinal slot 16 and a lower longitudinal slot 17 through which pass the necks of two screws 14 and 15 screwed into the body of a loader 3 arranged externally on the back of case 1. The neck height of said screws 14 and 15 is slightly greater than the total thickness of said case back and said support plate 10 so that the unit made up by plate 10 and loader 3 can carry out transverse movements and the loader moved longitudinally. To make these movements possible, said back of the case is provided with two slots 16' and 17', corresponding exactly to slots 16 and 17 of support plate 10 when the latter is in its upper position, and two rows of transverse slots, 4 and 5, issuing from slots 16' and 17', the width of which is equal to the diameter of screw neck 14. Support plate 10 carries a lever 18 pivoted at 19 for blocking loader 3, which presents opposite each slot 4 a depression 20 acting together with a roller 21 engaged by screw neck 14. A spring 22, stretched between the end of lever 18 and a hook 23 on support plate 10 draws lever 18 back against roller 21 in order to immobilize the loader in its chosen position, corresponding to one slot 4 or 5.

Loader 3 possesses as many channels 11 as there are slots 4. Said channels 11 extend (Fig. 6) from cover 3" towards the base of loader 3 where they curve in a circular arc and touch the outside of the back of case 1 (Fig. 5). Each of these channels contains lead sinkers 13 for attachment to a line. The channels are of different cross-sections for lead sinkers of different sizes (Fig. 3). In the example there are sinkers of four different calibres. Said sinkers 13 have a groove in which the line engages. In order that these sinkers, upon leaving the apparatus, are in the position desired for placing them on the line, the channels are provided with longitudinal ribs 12 of triangular cross-section which enter the grooves in the sinkers piled up in the channels.

Said back of case 1 has in its center a transverse slot 25 located opposite a transverse slot 25' in support plate 10, through both of which passes the shank of a screw 26 on which are pivoted the ends of two levers 27 and 27' arranged like the branches of a V. A spring 28 draws these levers together, the other ends of the levers being pivoted, by means of pins 29, on the sliding rods 6 of a sinker-fastening device.

When loader 3 is moved towards bottom 2" of said case, support plate 10 is likewise moved by an amount determined by the depth of slots 4 or 5, a depth which depends on the diameter of the lead to be used.

Screw 26 is in turn moved by support plate 10, causing levers 27 and 27' to open and rods 6 to slide, the ends of these rods moving apart to permit a lead sinker (Fig. 6) to lodge itself between them against a buffer 34, see below, the groove in said lead sinker, immediately after it leaves channel 11, coming in contact with the bevelled end 35 of a lever 9, located at the extension of rib 12 when the loading device reaches its lower position (Fig. 6). A hairpin spring 38 maintains lever 9 either in the position marked by an unbroken line (Fig. 7) or in the position indicated by a broken line.

The aforementioned buffer 34, see Figs. 5, 6, 7 and 8, is held by a stepped plate 31, Fig. 8, passing through a slot 8, Fig. 1, on said back of the case, its various steps projecting therefrom. While being shifted lengthwise, loader 3 makes contact with the steps and pushes back to a greater or lesser extent plate 31, the end 31' of which, bent back at an angle at said back of case 1, is fixed by means of a screw 39. A compression spring 32, engaged by a stud 33 on cover 2, draws back plate 31. The steps of this plate are arranged in such a way that buffer 34 is more or less pushed towards said back of the case in accordance with the diameter of the sinker contained in the channel opposite the fastening device. The sinker which has left loader 3 is thus located in a setting suited to its dimensions and bounded by the ends of rods 6, buffer 34, the case and the bevel of lever 9.

The device described is used in the following manner:

After cover 3″, normally kept in place by a springbolt 42, Fig. 9, together with rod 3‴ has been removed, lead sinkers 13 are slid into the channel whose crosssection they fit. With the loader occupying the positions shown in Figs. 1, 2 and 5, the channels are closed below by said back of case 1 which is provided with an opening 1′ permitting the release of only one channel at a time opposite the jaws of the fastening device consisting of the ends of rods 6. The lead sinkers pile up in the channels, Fig. 5. Cover 3″ is replaced and the device is ready for use. The size of lead sinker is selected by moving the loader lengthwise while it is occupying its position away from bottom 2″ as in Figs. 1, 2 and 5, until the corresponding channel is located opposite opening 1′. The exact position is determined by the depressions 20 of spring lever 18. The loader has also depressed plate 31, so that buffer 34 is placed in the right position. The loader is now lowered towards bottom 2 to the position indicated in Fig. 6. The run of the loader is limited by slots 4 and 5 located opposite screw shanks 14 and 15, the depth of which depends on the size of the lead sinkers. The latter can therefore slide out of the channel and arrange themselves astride the bevelled portion 35 of lever 9, for while the loader is being lowered the jaws of the fastening device have opened by an amount just a little greater than the diameter of the sinkers, which amount also depends on the run of the loader since plate 10 has pushed back pivot 26. The loader is released and by the action of spring 28 ascends part of the way. Spring 28 likewise causes the jaws of the fastening device to close, which then grips the lead and keeps it in place. The apparatus is turned 180° so that knobs 7 and lever 9 face upwards, lever 9 is swung to the position indicated by the broken line, the fishing line is placed in the uncovered slot in the lead sinker and the slot is closed by means of manual pressure on knobs 7 of the fastening device. Fastening is carried out with one hand while the apparatus and thread are held in the other.

Cover 3″ is provided with grooves 40 arranged opposite the inlet openings of channels 12 and the dimensions and shape of said grooves are such that the lead sinkers 13 cannot leave their channels, but are adequate for introducing a rod 41 housed in the case (Fig. 1) in order to push the lead sinkers should one of them get stuck (Fig. 10). Rod 41 also serves for pushing back the bolt for releasing rod 3‴ on cover 3″.

Figs. 12 and 13 show a sectional view of an embodiment with a simplified fastening device while the rest of the apparatus is identical with the one described above. The fastening device consists of a pair of pincers, the two arms of which, 43 and 44, are pivoted at an intermediate point on the neck of a screw 45 fixed to said back of case 1 and passing through a transverse slot, not visible in the drawing, in support plate 10, said slot permitting the support plate to move transversely in the case. A spring 46 keeps the jaws of the pincers, 43′ and 44′, closed.

The device according to Figs. 12 and 13 is used in the following manner:

As in the preceding case, the opening in the selected channel is brought opposite the jaws and the loader pushed towards bottom 2″. Wedge 47 held by lever 18 which follows the movement of plate 10 is introduced between arms 43 and 44 and opens jaws 43′ and 44′ just a little more than the diameter of the lead sinker falling between the jaws. The loader is released, jaws 43′ and 44′ gripping the lead sinker by the action of spring 46. The instrument is reversed, lever 9 is pulled out and the fishing line is placed in the slot in the lead sinker. Finally, the lead sinker is pressed by manipulating the pincers, the handles of which are bent back at the ends for this purpose.

As can be seen, the devices described obviate the drawbacks mentioned at the beginning of this description thanks to the possibility of selecting sinkers of the desired calibre and of placing them between the jaws of the pincers without handling them.

I claim:

1. A device for affixing lead sinkers to a fishing line, comprising a parallelpiped-shaped case having an opening therein, a lead sinker-fastening device having normally closed jaws positioned in said casing opening, a loader provided with several parallel channels each for different calibres slotted lead sinkers, means operated by said loader for opening said jaws sufficiently to permit a lead sinkers to pass between said jaws, each load channel having a longitudinal rib engaging the slots in the lead sinkers for guiding lead sinkers, said loader being movably mounted on the outside of said case for being moved lengthwise in relation to said case in order that each of said channels can be presented in turn opposite said jaws, and transversely of said case in order that the outlet of the selected channel can be brought to the height of said jaws, means for limiting the transverse movement of said loader in accordance with the calibre of the lead sinkers contained in the selected channel, an adjustable buffer element located at the back on the side of said jaws opposite to said channels, means for automatically positioning said buffer regulated by said loader in accordance with the calibre of the lead sinkers, a movable guide which in its working position is located on the rib extension of the selected channel for receiving lead sinkers passing between said jaws which lead sinkers slide on said guide until it comes to rest against said buffer element, and resilient means for moving said jaws upon the release of said loader for gripping the lead sinkers against said buffer permitting the guide to be moved aside and a fishing line to be placed in the slot in the lead sinkers which can be pressed together by manual operation of the fastening device.

2. A device according to claim 1, wherein said means for opening said jaws comprises two levers pivoted at one of their ends on a pivot on said loader which follows said loader in its transverse movements and are hinged at their other ends on two sliding rods positioned in line with their opposing ends providing said jaws, so that when the loader is moved transversely these jaws open automatically by an amount determined by the loader's length of movement.

3. A device according to claim 1, wherein said fastening device comprises a pair of pincers having two arms pivoted at an intermediate point on a pivot forming an integral part of said case, said pincers having handles projecting outside said case so that the pincers can be manually manipulated in order to affix the sinkers to the fishing line.

4. A device according to claim 1, wherein a support plate is movably mounted in said case against the back thereof for transverse movement, a pair of screws connects said loader to said plate, said case has a longitudinal slot in the bottom thereof and a longitudinal slot opposite said support plate with each slot having one of said screws extending therethrough permitting the lengthwise displacement of said loader, a pivoted lever controls said loader, said case back being provided in addition to said longitudinal slot with a series of transverse slots issuing onto said longitudinal slot and whose lengths depend on the calibre of the lead sinkers contained in the different channels, said slots permitting and limiting the transverse movement of said loader.

5. A device according to claim 1, wherein a support plate is movably mounted in said case against the back thereof for transverse movement, a pair of screws connects said loader to said plate, said case has a longitudinal slot in the back thereof and a longitudinal slot opposite said support plate with each slot having one of said screws extending therethrough permitting the lengthwise displacement of said loader, a pivoted lever controls said loader, said case back being provided in addition to said longitudinal slot with a series of transverse slots issuing onto said longitudinal slot and whose lengths depend on the calibre of the lead sinkers contained in the different channels, said slots permitting and limiting the transverse movement of said loader, said case back has a transverse slot, said support plate has a transverse slot, with said pivot extending through both slots whereby said support plate is drawn transversely when said loader is manually moved transversely in one direction and resilient means is provided for returning said plate in the opposite direction upon release of said loader.

6. A device according to claim 1, wherein a support plate is movably mounted in said case against the back thereof for transverse movement, a pair of screws connects said loader to said plate, said case has a longitudinal slot in the bottom thereof and a longitudinal slot opposite said support plate with each slot having one of said screws extending therethrough permitting the lengthwise displacement of said loader, a pivoted lever controls said loader, said case back being provided in addition to said longitudinal slot with a series of transverse slots issuing onto said longitudinal slot and whose lengths depend on the calibre of the lead sinkers contained in the different channels, said slots permitting and limiting the transverse movement of said loader, said support plate has a transverse slot through which said pivot extends permitting transverse movement of said plate, a wedge is carried by said plate for being introduced between the handles of said pincers upon following said support plate in its movements.

References Cited in the file of this patent

UNITED STATES PATENTS 2,829,550     Hamshaw ---------------- Apr. 8, 1958

FOREIGN PATENTS 46,879     Switzerland ------------ Apr. 24, 1909